Jan. 24, 1933.  J. B. DE MEES  1,895,027
APPARATUS FOR RAISING LIQUIDS
Filed March 31, 1930

Inventor
Jean Baptiste De Mees
per:
Attorney

UNITED STATES PATENT OFFICE

JEAN BAPTISTE DE MEES, OF BERCHEM-ANTWERP, BELGIUM

APPARATUS FOR RAISING LIQUIDS

Application filed March 31, 1930, Serial No. 440,546, and in Belgium April 5, 1929.

The present invention has relation to an apparatus for raising liquids, of the type employing centrifugal force for producing a displacement of liquid from a given level to another higher level.

The object of the invention is to provide an apparatus of this kind constituted by a simple rigid structure without movable accessories, which, revolving about a horizontal axis, generates centrifugal force and utilizes same for raising the liquid, a portion only of said centrifugal force, proportional to the ascension of liquid, being lost.

According to the invention, the liquid, contained in a reservoir or the like, is projected by centrifugal force against the walls of a suction tank, arranged at the bottom of the apparatus, and penetrates into an upper container through an annular passage of U-shaped cross section, whereby a suction is operated on the liquid in the reservoir, the thus sucked liquid being raised in said upper container which revolves with the apparatus, and flowing over the upper edge of said container.

According to the invention, said annular passage of U-shaped cross section consists of an airtight diaphragm or partition, operating in conjunction with the bored bottom or an outstanding part or projection of the upper container. This annular passage of U-shaped cross section is of course very important, since without it, the pressure on the liquid contained in the suction tank would be the same as that which is exerted on the liquid outside the apparatus, whereby said liquid could not be raised in the rotary apparatus.

The liquid, under the impulsion of the centrifugal force, is forced into the upper container through the annular passage of U-shaped cross section and is projected against the walls of this container, so that it will have a tendency to cover said walls with a mass of liquid occupying an approximately vertical position. The container is given the shape of a truncated cone, the greater base of which is placed at the higher level and, therefore, the liquid would not be able to occupy this vertical position, but will follow the slope of the lateral wall of the container and will hasten to flow over the upper edge of same.

The invention will be described hereafter in detail with reference to the figures of the accompanying drawing, which illustrate, merely by way of example, two forms of construction of the invention.

Figure 2:
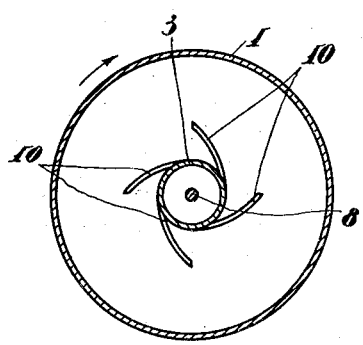
Fig. 2 is a horizontal sectional view of the apparatus on line II—II of Fig. 1.
Figure 1:
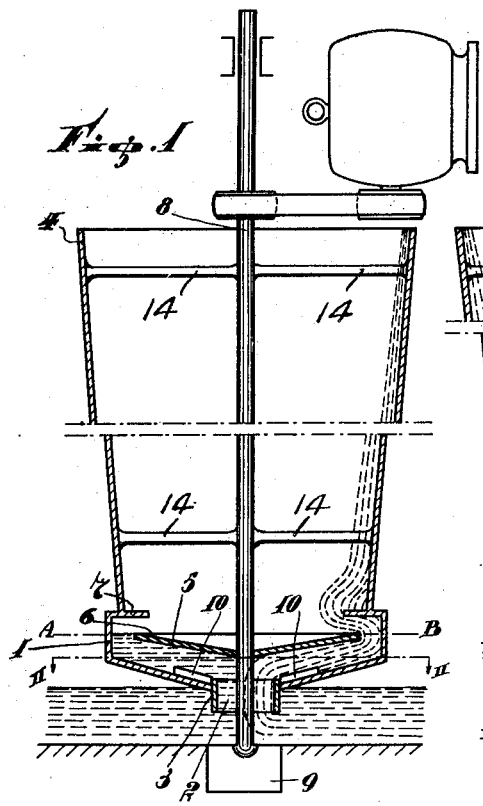
Fig. 1 is a vertical sectional view of an apparatus according to the first form of construction.

Referring to Figs. 1 and 2, the apparatus according to the first form of construction comprises a suction tank 1, the central portion 2 of which is open and communicates, through a tube 3, with a reservoir or the like for the liquid to be raised. The bottom of the suction tank 1 is provided with vanes 10 disposed tangentially to the suction tube 3. Within the suction tank 1, the upper part of which communicates with an elevating and discharge container 4, is arranged a diaphragm or partition 5, which is perfectly airtight leaving a free ring space between its outer edge and the vertical wall of the suction tank 1. This container 4 has the shape of a truncated cone with its greater base placed at the higher level and is connected to the central shaft 8 by means of radial arms 14.

The bottom of the container 4 is cut or bored in its central portion, so as to leave a circular inner projection 7, its inner diameter being smaller than the outer diameter of the partition 5, so that an annular passage of U-shaped cross section is formed. The function of this annular passage of U-shaped cross section is to enable the liquid contained in the tank 1 and subjected to centrifugal force, to penetrate into the container 4. The walls of the airtight diaphragm 5 may be downwardly inclined towards the axis of the tank 1 and join at the central shaft 8, in order to allow the air which might be contained in the suction tank 1, to escape.

All the above-mentioned members, i. e. the container 4, the suction tank 1 and the airtight diaphragm 5 are rigidly connected to the shaft 8, which is supported in a footstep bearing 9 at its lower end and a bearing at its upper end, and which is driven from an electric motor or any other motor through the medium of a belting, gears or other transmission members.

The right hand portion of Fig. 1 shows the path followed by the liquid in the tanks 1 and 4 when the apparatus operates.

As can be seen on the left hand side of Fig. 1, which illustrates the apparatus when not operating, it is absolutely necessary that the liquid reaches the level A—B when the apparatus is started.

When the shaft 8 and the various members secured thereto are rotated, the liquid is projected under the action of the centrifugal force against the walls of the suction tank 1 and will tend to reach the container 4 through the annular passage of the U-shaped cross section, and to rise along the wall of said container, finally to flow over the upper edge of same.

The suction is obtained in the suction tank 1 in the following manner:

When the suction tank 1 is filled with liquid and the apparatus is rotated, the centrifugal force will act on the liquid, so as to cause the latter to penetrate through the annular passage of the U-shaped cross section, whereby an empty space would be created in the tank 1 if air were allowed therein; but, as all entry of air is prevented by the air-tight diaphragm 5, the liquid cannot leave the suction tank 1 without same being again filled with fresh liquid from the reservoir. From this it will be understood that a continuous suction and arrival of liquid is generated in the suction tank 1.

Figure 3:
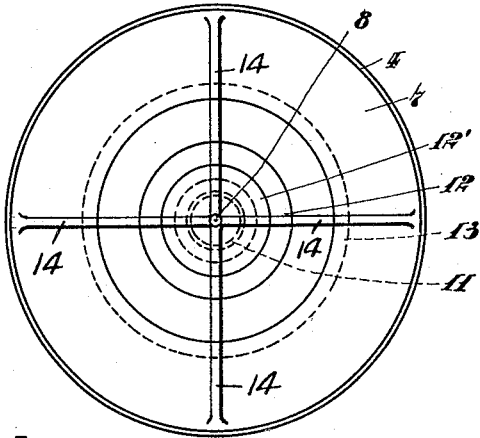
Fig. 3 is a plan view of the apparatus according to the second form of construction.
Figure 4:
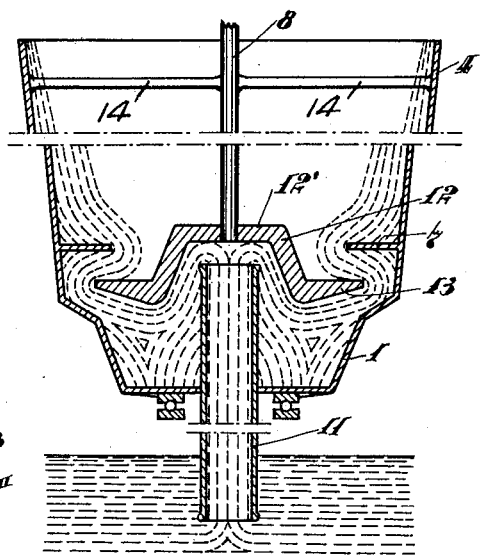
Fig. 4 is a vertical sectional view of the apparatus according to said second form of construction.

With reference to Figs. 3 and 4, the apparatus again consists of a discharge container 4, which is separated from a suction tank 1 through an outstanding part or projection 7, an airtight diaphragm or partition 12 being also provided comprising a central horizontal portion 12', located at a higher level than its horizontal edge portion 13 and connected to the latter by an inclined middle portion. The edge portion 13 is at a lower level than the projection 7 and these two elements constitute together with the walls of the suction tank 1, the annular passage of U-shaped cross section the function of which has already been sufficiently specified. In the suction tank 1 issues a suction pipe 11, which penetrates into said tank to a level situated very near to the central portion 12' of the diaphragm 12.

The rotation of the apparatus is obtained in the same manner as in the first form of construction and the working of the apparatus is absolutely the same.

Apparatus for raising liquid according to the invention may be constructed for very differing amounts of liquids, for instance from 0,3 to 5 m.$^3$ or more in one second and they may attain 10 or 20 m. or more in height. Friction in such apparatus is minimized, since the only friction which is to be contemplated is that of the shaft 8 revolving in its footstep bearing 9 and its upper bearing.

Such apparatus have the great advantage of never becoming obstructed or being wedged or jammed, since no strainers, flaps or pistons are used. The stream of liquid will not be interrupted under the action of mud, sand or small pebbles carried with the stream, but only large obstacles unable to pass through the annular passage of the U-shaped cross sections are capable of reducing the efficiency of the apparatus.

The apparatus according to the invention is particularly suited for the feed of large hydraulic plants, namely for pumping stations, docks, dry docks, sewers, hydraulic machines, canals, irrigating plants, water supply plants and the like.

It must be understood that the present invention is not restricted to the forms of construction which have been described and illustrated and that various constructional details may be brought thereto without departing from the scope of the invention.

I claim:

1. A centrifugal apparatus for raising liquids, comprising in combination: a vertical container in the shape of a truncated cone with upwardly increasing diameter, a central suction mouth in the bottom of said container, a central vertical shaft supporting said container by means of radial arms, a disc fixed on said shaft at a short distance above said suction mouth, the diameter of said disc being smaller than that of the container, an annular flange projecting from the inner wall of the container at a short distance above said disc, the smaller diameter of said annular flange being less than the diameter of the disc, and means for rotating the shaft and the container for the purpose set forth.

2. A centrifugal apparatus for raising liquids, comprising in combination: a vertical container in the shape of a truncated cone with upwardly increasing diameter, a central suction tube extending inside from the bottom of said container, a central vertical shaft supporting said container by means of radial arms, a disc fixed on said shaft at a short distance above said suction tube, the diameter of said disc being smaller than that of the container, an annular flange projecting from the inner wall of the container at a short distance above said disc, the smaller diameter of said annular flange being less than the diameter of the disc, and means for rotating the shaft and the container for the purpose set forth.

In testimony whereof I signed hereunto my name.

J. B. DE MEES.